(12) United States Patent
Ishiyama et al.

(10) Patent No.: US 10,203,080 B1
(45) Date of Patent: Feb. 12, 2019

(54) LIGHTING DEVICE FOR VEHICLES AND LIGHTING TOOL FOR VEHICLES

(71) Applicant: Toshiba Lighting & Technology Corporation, Yokosuka-shi, Kanagawa-ken (JP)

(72) Inventors: Masayuki Ishiyama, Yokosuka (JP); Ryuji Tsuchiya, Yokosuka (JP); Kiyokazu Hino, Yokosuka (JP); Toshihiro Hatanaka, Yokosuka (JP); Daisuke Kosugi, Yokosuka (JP); Hiromitsu Shiraishi, Yokosuka (JP); Takashi Kaneko, Yokosuka (JP); Kazuhisa Iwashita, Yokosuka (JP)

(73) Assignee: Toshiba Lighting & Technology Corporation, Yokosuka-shi, Kanagawa-ken (JP)

( * ) Notice: Subject to any disclaimer, the term of this patent is extended or adjusted under 35 U.S.C. 154(b) by 0 days.

(21) Appl. No.: 15/908,913

(22) Filed: Mar. 1, 2018

(30) Foreign Application Priority Data

Aug. 10, 2017 (JP) .................................. 2017-155395

(51) Int. Cl.
| | |
|---|---|
| *F21V 11/00* | (2015.01) |
| *F21S 41/19* | (2018.01) |
| *B60Q 1/04* | (2006.01) |
| *F21S 41/141* | (2018.01) |

(52) U.S. Cl.
CPC .......... *F21S 41/194* (2018.01); *B60Q 1/0416* (2013.01); *F21S 41/141* (2018.01)

(58) Field of Classification Search
None
See application file for complete search history.

(56) References Cited

U.S. PATENT DOCUMENTS

| | | | |
|---|---|---|---|
| 2015/0016136 A1 | 1/2015 | Nakano et al. | |
| 2016/0290621 A1 | 10/2016 | Ozawa et al. | |
| 2017/0146213 A1 | 5/2017 | Kosugi et al. | |

FOREIGN PATENT DOCUMENTS

| | | |
|---|---|---|
| EP | 3037715 A1 | 6/2016 |
| EP | 3059490 A1 | 8/2016 |
| JP | 2013-247062 A | 12/2013 |

OTHER PUBLICATIONS

Sep. 28, 2018—(EP) Extended Search Report—App 18158609.0.

*Primary Examiner* — Vip Patel
(74) *Attorney, Agent, or Firm* — Banner & Witcoff, Ltd.

(57) ABSTRACT

According to one embodiment, a lighting device for vehicles includes a mounting unit including a recessed portion which is provided on one face of a flange, and is open to an end face on a side opposite to a side of the flange; a substrate which is provided on a lower face side of the recessed portion, and includes a light emitting element on a face on the side opposite to a side of the flange; and a plurality of power feeding terminals which protrude from the lower face of the recessed portion, and are soldered to a wiring pattern provided on the substrate, in which a notch portion is provided at a portion on a side face of the recessed portion which faces the plurality of power feeding terminals.

20 Claims, 6 Drawing Sheets

LIGHTING DEVICE FOR VEHICLES AND LIGHTING TOOL FOR VEHICLES

CROSS-REFERENCE TO RELATED APPLICATIONS

This application is based upon and claims the benefit of priority from Japanese Patent Application No. 2017-155395, filed on Aug. 10, 2017; the entire contents of which are incorporated herein by reference.

FIELD

Embodiments described herein relate generally to a lighting device for vehicles, and a lighting tool for vehicles.

BACKGROUND

There is a lighting device for vehicles provided with a socket and a light emitting unit including a light emitting diode (LED). In general, the light emitting unit is provided inside a recessed portion which is open to one end face of the socket.

Since the lighting device for vehicles provided with the light emitting diode is expensive compared to a lighting device for vehicles provided with a filament light bulb, the lighting device for vehicles provided with the light emitting diode has not been used in a popular vehicle such as a light vehicle, in general. However, in recent years, a price of the lighting device for vehicles provided with the light emitting diode is reduced, and the lighting device for vehicles provided with the light emitting diode is also adopted in the popular vehicle such as the light vehicle.

It is necessary to make an external dimension (sectional dimension) of an end portion of a socket to which a recessed portion is open small, in order to use the lighting device for vehicles provided with the light emitting diode in the popular vehicle such as the light vehicle. For this reason, a distance between a side face of the recessed portion and a power feeding terminal which is electrically connected to the light emitting unit becomes short, and it was not easy to perform soldering between the light emitting unit and the power feeding terminal.

Therefore, it is desirable to develop a technology in which it is possible to easily perform a soldering work, even when the external dimension of the end portion of the socket is set to be small.

DETAILED DESCRIPTION

Figure 1:
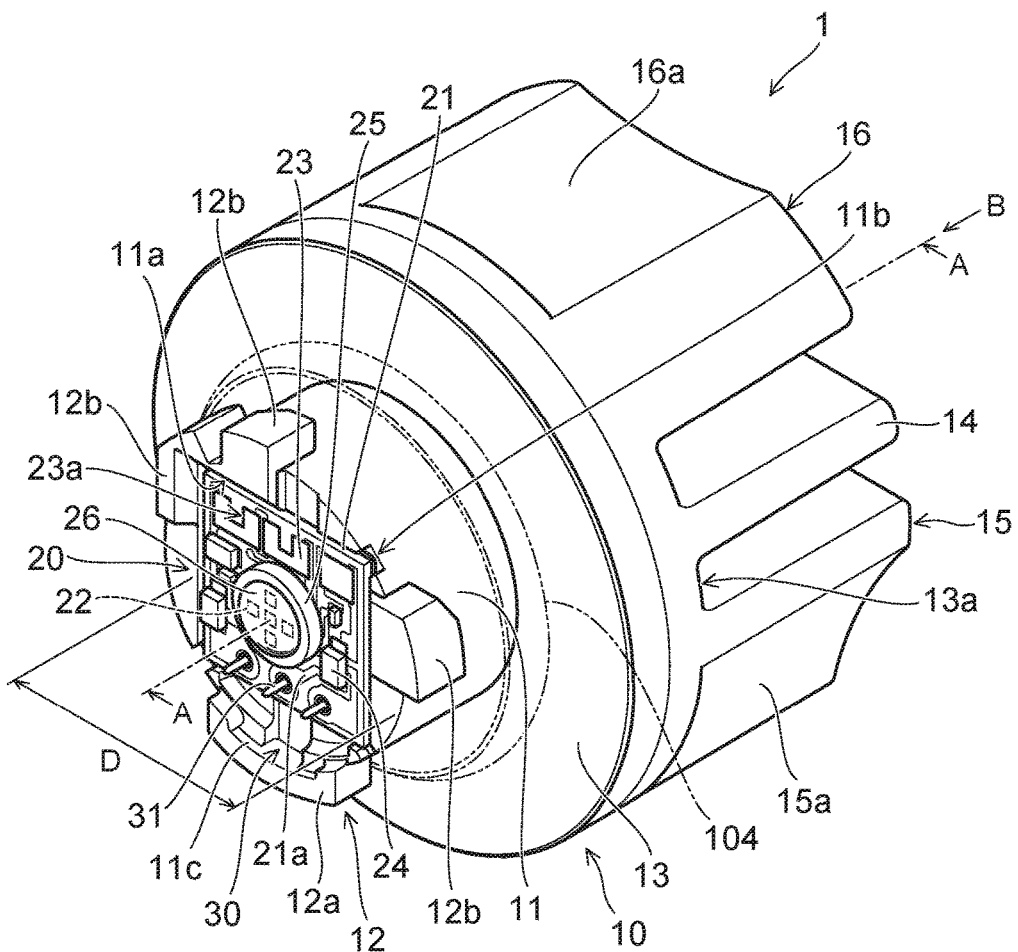
FIG. 1 is a schematic perspective view for exemplifying a lighting device for vehicles according to an embodiment.

A lighting device for vehicles according to one embodiment is provided with a mounting unit including a recessed portion which is provided on one face of a flange, and is open to an end face on a side opposite to a side of the flange; a substrate which is provided on a lower face side of the recessed portion, and includes a light emitting element on a face on the side opposite to a side of the flange; and a plurality of power feeding terminals which protrude from the lower face of the recessed portion, and are soldered to a wiring pattern provided on the substrate. A notch portion is provided at a portion on a side face of the recessed portion which faces the plurality of power feeding terminals.

Hereinafter, the embodiment will be exemplified while referring to drawings. In each figure, the same constituent elements are attached to the same reference numerals, and detailed descriptions thereof will be appropriately omitted.

Lighting device for vehicles

A lighting device for vehicles 1 according to the embodiment can be provided in a vehicle, a railway vehicle, or the like, for example. As the lighting device for vehicles 1 provided in a vehicle, for example, it is possible to exemplify a device which is used in a front combination light (for example, light in which daytime running lamp (DRL), position lamp, turn signal lamp, and the like, are appropriately combined), a rear combination light (for example, stop lamp, tail lamp, turn signal lamp, back lamp, fog lamp, and the like, are appropriately combined), or the like. However, a use of the lighting device for vehicles 1 is not limited to these.

FIG. 1 is a schematic perspective view for exemplifying the lighting device for vehicles 1 according to the embodiment.

Figure 2:
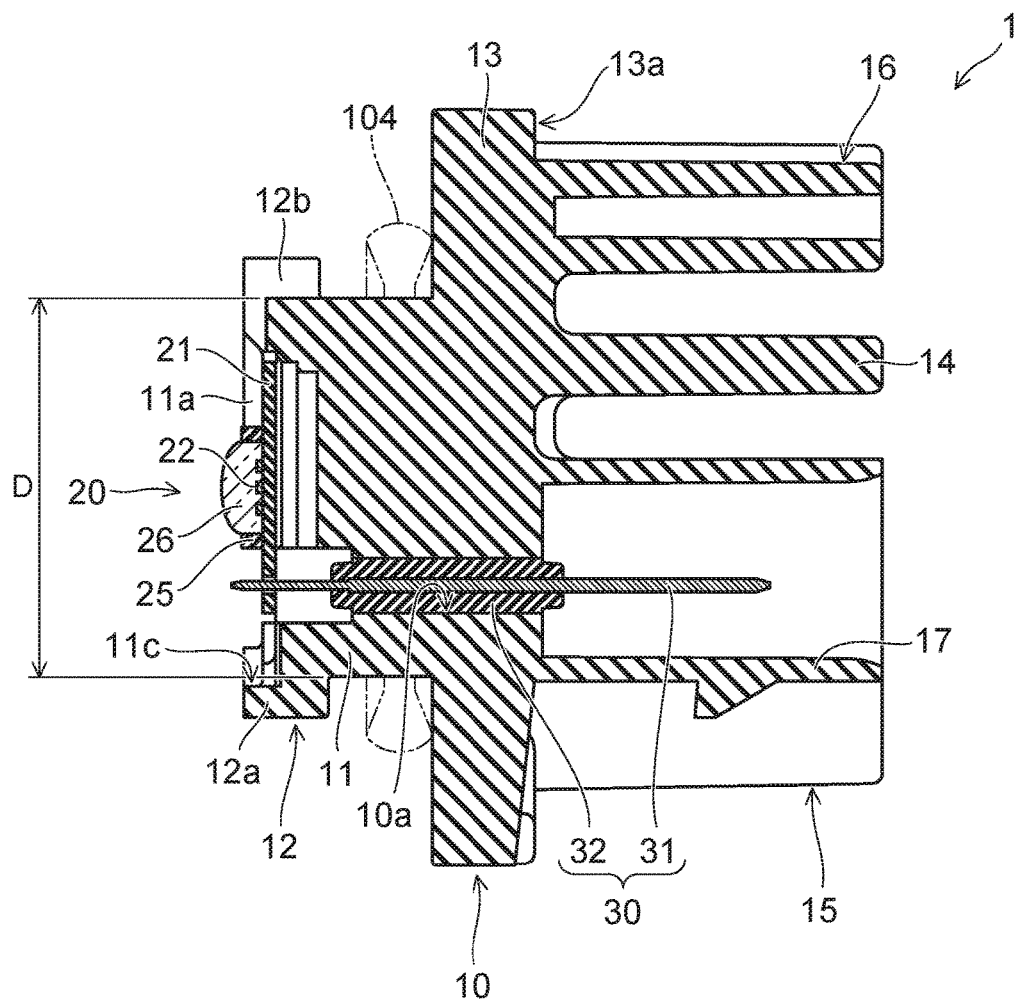
FIG. 2 is a sectional view of the lighting device for vehicles which is taken along line A-A in FIG. 1.

FIG. 2 is a sectional view of the lighting device for vehicles 1 which is taken along line A-A in FIG. 1.

Figure 3:
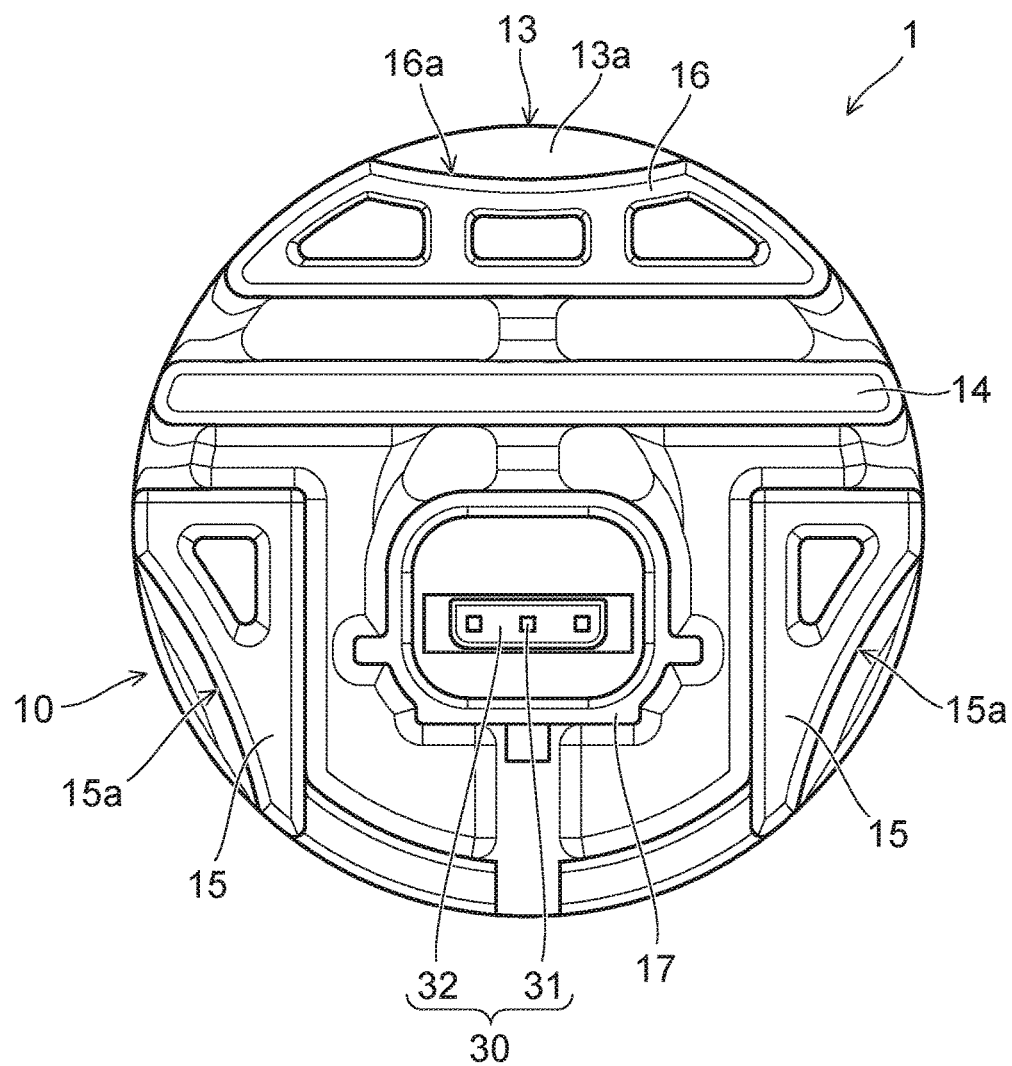
FIG. 3 is a schematic view in which the lighting device for vehicles in FIG. 1 is viewed from a direction of an arrow B.

FIG. 3 is a schematic view which is viewed from a direction of an arrow B of the lighting device for vehicles 1 in FIG. 1.

As illustrated in FIGS. 1 to 3, a lighting device for vehicles 1 is provided with a socket 10, a light emitting unit 20, and a power feeding unit 30.

The socket 10 includes a mounting unit 11, a bayonet 12, a flange 13, a heat radiating fin 14, projection portions 15 and 16, and a terminal cover 17.

The mounting unit 11 is provided on one face of the flange 13. The mounting unit 11 is provided on a side opposite to a side on which the heat radiating fin 14 of the flange 13 is provided. An external shape of the mounting unit 11 can be set to a columnar shape. The external shape of the mounting unit 11 can be set to a cylindrical shape, for example. The mounting unit 11 includes a recessed portion 11a which is opened to an end face on a side opposite to a side of the flange 13.

In addition, it is possible to provide at least one slit 11b in the mounting unit 11. The slit 11b passes through a portion between an outer side face of the mounting unit 11 and an inner face (side face of recessed portion 11a) of the mounting unit 11. In addition, one end portion of the slit 11b is open to an end face of the mounting unit 11 on a side opposite to the flange 13 side. A corner portion of a substrate 21 is provided inside the slit 11b. A dimension (width dimension) of the slit 11b in a circumferential direction of the mounting unit 11 is set to be slightly larger than a dimension of the corner portion of the substrate 21. For this reason, it is possible to position the substrate 21 by inserting the corner portion of the substrate 21 into the slit 11b.

In addition, when the slit 11b is provided, it is possible to make a planar dimension of the substrate 21 large. For this reason, it is possible to increase the number of elements which are mounted on the substrate 21. Alternatively, since it is possible to make an external dimension D (sectional dimension) of the mounting unit 11 small, it is possible to make the mounting unit 11 small, and the lighting device for vehicles 1 small.

A plurality of the bayonets 12 are provided on the outer side face of the mounting unit 11. The plurality of bayonets 12 protrude toward the outside of the lighting device for vehicles 1. The plurality of bayonets 12 face the flange 13. The plurality of bayonets 12 are used when attaching the lighting device for vehicles 1 to a housing 101 of a lighting tool for vehicles 100. The plurality of bayonets 12 are used in a twist lock.

In addition, the plurality of bayonets 12 can include a first bayonet 12a and a second bayonet 12b. The first bayonet 12a and the second bayonet 12b will be described in detail later.

The flange 13 is formed in a plate shape. The flange 13 can be formed in a disk shape for example. The outer side face of the flange 13 is provided on the outer part of the lighting device for vehicles 1 compared to the outer side face of the bayonet 12.

The heat radiating fin 14 is provided on a face 13a of the flange 13 on a side opposite to the side on which the mounting unit 11 is provided. The heat radiating fin 14 can be formed in a flat plate shape. The number of the heat radiating fins 14 is not particularly limited, and one or more heat radiating fins 14 can be provided. In the socket 10 exemplified in FIGS. 1 to 3, one heat radiating fin 14 is provided. When a plurality of the heat radiating fins 14 are provided, the plurality of heat radiating fins 14 can be provided so as to be parallel to each other. In addition, also the projection portions 15, 16, and the terminal cover 17 can have a function of the heat radiating fin. For this reason, the heat radiating fin 14 can be provided, if necessary.

The projection portions 15 and 16 can be formed in a block shape. For example, a thickness of the thickest portion of the projection portions 15 and 16 can be set to one and a half times or more of the thickness of the heat radiating fin 14. For this reason, rigidity of the projection portions 15 and 16 becomes larger than rigidity of the heat radiating fin 14. In addition, at least any one of the projection portions 15 and 16 can be provided with a recessed portion which is open to an end face on a side opposite to the flange 13 side. When the recessed portion is provided, it is possible to obtain light weight, an increase in heat radiating area, a decrease in use amount of a material, or the like, while suppressing a decrease in rigidity.

The projection portions 15 and 16 protrude from the face 13a of the flange 13. The projection portion 15 is provided in vicinity of the peripheral edge of the flange 13. A plurality of the projection portions 15 can be provided. As illustrated in FIG. 3, two projection portions 15 are provided in the socket 10. The terminal cover 17 is provided between the plurality of projection portions 15. The plurality of projection portions 15 and the terminal cover 17 can be provided in line in a direction intersecting a direction in which the heat radiating fin 14 and the projection portion 16 are aligned. A distance from the face 13a of the flange 13 to an end face of the projection portion 15 can be set to be approximately the same as that from the face 13a of the flange 13 to an end face of the terminal cover 17. Here, since a connector 105 is mounted on the terminal cover 17, it is difficult to make an external dimension (thickness dimension) of the terminal cover 17 large. For this reason, there is a case in which resistance of the terminal cover 17 to an external force decreases. In the lighting device for vehicles 1 according to the embodiment, the terminal cover 17 is provided at a portion between the plurality of projection portions 15. In addition, the plurality of projection portions 15 are provided in the vicinity of the peripheral edge of the flange 13, and the terminal cover 17 is provided at a center region of the flange 13. For this reason, it is possible to prevent an external force from being added to the terminal cover 17.

The projection portion 16 is provided in the vicinity of the peripheral edge of the flange 13. The projection portion 16 is provided on a side opposite to the plurality of projection portions 15 side by interposing the heat radiating fin 14 therebetween. For this reason, both side face sides of the heat radiating fin 14 are surrounded with the plurality of the projection portions 15 and the projection portion 16. A distance from the face 13a of the flange 13 to an end face of the projection portion 16 can be set to be approximately the same as that from the face 13a of the flange 13 to the end face of the heat radiating fin 14. In addition, respective end faces of the projection portion 15, the projection portion 16, the terminal cover 17, and the heat radiating fin 14 can be provided at the same position.

Here, when setting the thickness of the heat radiating fin 14 to be thin, it is possible to provide the heat radiating fin 14 also in a region which becomes narrow due to a miniaturization of the socket 10. When it is possible to provide the heat radiating fin 14, it is possible to make a heat radiating area large. However, when the thickness of the heat radiating fin 14 becomes thin, resistance of the heat radiating fin 14 to an external force decreases. In the lighting device for vehicles 1 according to the embodiment, the both side face sides of the heat radiating fin 14 are surrounded with the plurality of projection portions 15 and the projection portion 16. For this reason, it is possible to prevent an external force from being added to the heat radiating fin 14.

That is, when the projection portions 15 and 16 are provided, it is possible to prevent a worker from grasping the heat radiating fin 14 and the terminal cover 17 when mounting the lighting device for vehicles 1 on the lighting tool for vehicles 100. For this reason, it is possible to prevent the heat radiating fin 14 and the terminal cover 17 from being damaged. In addition, when providing the projection portions 15 and 16, a worker easily grasps the socket 10 when mounting the lighting device for vehicles 1 on the lighting tool for vehicles 100.

In addition, it is possible to provide a recessed portion 15a on the outer side face of the projection portion 15. It is possible to provide a recessed portion 16a on an outer side face of the projection portion 16. The recessed portions 15a and 16a can be set to recessed portions with a curved face. Shapes of the recessed portions 15a and 16a can be set so as to coincide with a person's finger, for example. When the recessed portions 15a and 16a are provided, a worker can grasp the socket 10 easily, when mounting the lighting device for vehicles 1 on the lighting tool for vehicles 100.

The terminal cover 17 has a function of protecting the end portion of a power feeding terminal 31, and a function of holding the connector 105. The terminal cover 17 is provided on the face 13a of the flange 13. The terminal cover 17 is provided at the center region of the flange 13. The terminal cover 17 can be formed in a rectangular cylindrical shape, for example. An end portion of the power feeding terminal 31 protrudes to the inside of the terminal cover 17. The connector 105 including a sealing member is mounted on the terminal cover 17.

Heat generated in the light emitting unit 20 is mainly transmitted to the heat radiating fin 14, the projection portion 15, the projection portion 16 and the terminal cover 17 through the mounting unit 11 and the flange 13. The heat transmitted to the heat radiating fin 14, or the like, is radiated to the outside. For this reason, it is preferable to form the socket 10 using a material with high heat conductivity by taking into consideration of transmitting heat generated in the light emitting unit 20 to the outside. The material with high heat conductivity can be set to, for example, a high heat conductive resin, or the like. The high heat conductive resin is a resin, for example, obtained by mixing filler in which an inorganic material is used into a resin such as polyethylene terephthalate (PET) or nylon. The filler can be set to filler which includes ceramic such as aluminum oxide, or carbon. When forming the socket 10 using the high heat conductive resin, it is possible to efficiently radiate heat generated in the light emitting unit 20, and realize light weight.

The mounting unit 11, the bayonet 12, the flange 13, the heat radiating fin 14, the projection portion 15, the projection portion 16, and the terminal cover 17 can be integrally molded by using injection molding, or the like. When these elements are integrally molded, heat transmission becomes easy, and it is possible to improve a heat radiating property. In addition, it is easy to obtain a reduction in manufacturing cost, a miniaturization, light weight, or the like.

The light emitting unit 20 is provided inside the recessed portion 11a. The light emitting unit 20 includes the substrate 21, a light emitting element 22, a resistor 23, a control element 24, a frame portion 25, and a sealing portion 26.

The substrate 21 is formed in a flat plate shape. A planar shape of the substrate 21 can be set to a quadrangle shape, for example. A material or a structure of the substrate 21 is not particularly limited. For example, the substrate 21 can be formed of an inorganic material such as ceramic (for example, aluminum oxide, or aluminum nitride), or an organic material such as paper phenol or glass epoxy. In addition, the substrate 21 may be obtained by covering the surface of a metal plate with an insulating material. When covering the surface of the metal plate with the insulating material, the insulating material may be formed of an organic material, or an inorganic material. When a heat generating amount of the light emitting element 22 is large, it is preferable to form the substrate 21 using a material with high heat conductivity in a viewpoint of heat radiating. As the material with high heat conductivity, for example, ceramic of aluminum oxide, aluminum nitride, or the like, a high heat conductive resin, a material obtained by covering the surface of the metal plate with the insulating material, or the like, can be exemplified. In addition, the substrate 21 may be a single layer or a multilayer.

In addition, a wiring pattern 21a is provided on the surface of the substrate 21. The wiring pattern 21a can be formed of a material of which a main component is silver. The wiring pattern 21a can be formed of silver or a silver alloy, for example. However, a material of the wiring pattern 21a is not limited to the material of which the main component is silver. The wiring pattern 21a can be formed of a material of which a main component is copper, for example.

The substrate 21 is provided on a lower face side of the recessed portion 11a, and includes the light emitting element 22 on a face on a side opposite to the flange 13 side. For example, it is possible to bond the substrate 21 on the lower face of the recessed portion 11a. A type of an adhesive is not particularly limited; however, it is preferable to be an adhesive with high heat conductivity. For example, the adhesive can be set to an adhesive into which filler using an inorganic material is mixed. It is preferable to set the inorganic material to a material with high heat conductivity (for example, ceramic of aluminum oxide, aluminum nitride, or the like). It is possible to set heat conductivity of the adhesive to 0.5 W/(m·K) or more and 10 W/(m·K) or less, for example.

In addition, it is also possible to provide a heat radiating plate between the substrate 21 and the lower face of the recessed portion 11a. The heat radiating plate is formed in a flat plate shape, and can be formed of metal such as aluminum or an aluminum alloy. It is possible to provide a layer formed of heat conductive grease (heat radiating grease), or the above described layer formed of an adhesive between the heat radiating plate and the lower face of the recessed portion 11a. A type of the heat conductive grease is not particularly limited; however, it is possible to set to heat conductive grease in which filler using a material with high heat conductivity (for example, ceramic of aluminum oxide, aluminum nitride, or the like) is mixed into modified silicone, for example. The heat conductivity of the heat conductive grease can be set to, for example, 1 W/(m·K) or more and 5 W/(m·K) or less.

The light emitting element 22 is provided on a face of the substrate 21 on a side opposite to the flange 13 side. The light emitting element 22 is provided on the substrate 21. The light emitting element 22 is electrically connected to the wiring pattern 21a which is provided on the surface of the substrate 21. The light emitting element 22 can be set to a light emitting diode, an organic light emitting diode, a laser diode, or the like, for example. A plurality of the light emitting elements 22 can be provided. The plurality of light emitting elements 22 can be connected in series to each other. In addition, the light emitting element 22 is connected to the resistor 23 in series.

The light emitting element 22 can be set to a chip-shaped light emitting element. The chip-shaped light emitting element 22 can be mounted, using chip on board (COB). When the chip-shaped light emitting element 22 is mounted, using COB, it is possible to provide many light emitting elements 22 in a narrow region. For this reason, it is possible to make the light emitting unit 20 small, and make the lighting device for vehicles 1 small. The light emitting element 22 is electrically connected to the wiring pattern 21a using wiring. The light emitting element 22 and the wiring pattern 21a can be electrically connected, using a wire bonding method.

In addition, it is also possible to set the light emitting element 22 to a surface-mounted light emitting element, or a shell-type light emitting element including a lead wire.

The resistor 23 is provided on a face of the substrate 21 on a side opposite to the flange 13 side. The resistor 23 is provided on the substrate 21. The resistor 23 is electrically connected to the wiring pattern 21a which is provided on the surface of the substrate 21. The resistor 23 can be set to, for example, a surface-mounted resistor, a resistor including a lead wire (metal oxide film resistor), a film-shaped resistor, or the like, which is formed by a screen printing method, or the like. In addition, the resistor 23 exemplified in FIG. 1 is the film-shaped resistor.

A material of the film-shaped resistor can be set to, for example, ruthenium oxide ($RuO_2$). The film-shaped resistor can be formed by a screen printing method and a baking method, for example. When the resistor 23 is the film-shaped resistor, it is possible to improve a heat radiating property, since it is possible to make a contact area between the resistor 23 and the substrate 21 large. In addition, it is possible to form a plurality of resistors 23 at one time. For this reason, it is possible to improve productivity, and suppress unevenness in resistance value in the plurality of resistors 23.

Here, since there is unevenness in forward voltage characteristics of the light emitting element 22, when setting an application voltage between an anode terminal and a ground terminal to be constant, there is unevenness in brightness of light (light flux, luminance, intensity of light, and illuminance) which is radiated from the light emitting element 22. For this reason, it is set so that a value of current which flows in the light emitting element 22 falls in a predetermined range using the resistor 23, so that a brightness of light radiated from the light emitting element 22 falls in a predetermined range. In this case, it is set so that a value of current which flows in the light emitting element 22 falls in a predetermined range, by changing a resistance value of the resistor 23.

When the resistor 23 is the surface mounting-type resistor or the resistor with a lead wire, the resistor 23 with an appropriate resistance value is selected according to the forward voltage characteristics of the light emitting element 22. When the resistor 23 is the film-shaped resistor, it is possible to increase a resistance value by forming an elimination portion 23a by removing a part of the resistor 23. For example, it is possible to easily remove a part of the resistor 23 by radiating laser light to the resistor 23. The number, a size, an arrangement, and the like, of the resistor 23 are not limited to examples, and can be appropriately changed according to the number, a specification, or the like, of light emitting elements 22.

The control element 24 is provided on a face of the substrate 21 on a side opposite to the flange 13 side. The control element 24 is provided on the substrate 21. The control element 24 is electrically connected to the wiring pattern 21a which is provided on the surface of the substrate 21. The control element 24 is provided so that a backward voltage is not applied to the light emitting element 22, and pulse noise from the backward direction is not applied to the light emitting element 22. The control element 24 can be set to a diode, for example. The control element 24 can be set to, for example, a surface-mounted diode, a diode including a lead wire, or the like. The control element 24 exemplified in FIG. 1 is the surface-mounted diode.

In addition to that, it is also possible to provide a pull-down resistor in order to detect a disconnection, or prevent erroneous lighting, or the like, of the light emitting element 22. In addition, it is also possible to provide a cover portion which covers the wiring pattern 21a, the film-shaped resistor, or the like. The cover portion can include a glass material, for example.

When it is a chip-shaped light emitting element 22, it is possible to provide the frame portion 25 and the sealing portion 26.

The frame portion 25 is provided on a face of the substrate 21 on a side opposite to the flange 13 side. The frame portion 25 is provided on the substrate 21. The frame portion 25 is bonded to the substrate 21. The frame portion 25 surrounds the plurality of light emitting elements 22. For example, the frame portion 25 is formed in an annular shape, and the plurality of light emitting elements 22 are disposed in the inner side. The frame portion 25 can be formed of a resin. The resin can be set to, for example, a thermoplastic resin such as polybutylene terephthalate (PBT), polycarbonate (PC), PET, nylon, polypropylene (PP), polyethylene (PE), and polystyrene (PS).

It is possible to improve reflectivity with respect to light output from the light emitting element 22 by mixing particles of titanium oxide, or the like, into a resin. It is not limited to the particles of titanium oxide, and particles formed of a material with high reflectivity with respect to light output from the light emitting element 22 may be mixed. In addition, the frame portion 25 also can be formed of a white resin, for example.

An inner wall face of the frame portion 25 can be set to an inclined face which inclines in a direction separated from a center axis of the frame portion 25 by being separated from the substrate 21. When the inner wall face of the frame portion 25 is inclined, a part of light output from the light emitting element 22 is reflected on the inner wall face of the frame portion 25, and is output toward the front face side of the lighting device for vehicles 1. That is, the frame portion 25 can have a function of regulating a forming range of the sealing portion 26, and a function of reflector.

The sealing portion 26 is provided inside the frame portion 25. The sealing portion 26 is provided so as to cover the inside of the frame portion 25. That is, the sealing portion 26 is provided inside the frame portion 25, and covers the light emitting element 22, wiring, or the like. The sealing portion 26 is formed of a material with a light-transmitting property. The sealing portion 26 can be formed by filling a resin in the inside of the frame portion 25, for example. Filling of the resin can be performed by a fixed amount discharge device for liquid such as a dispenser, for example. The resin to be filled can be set to a silicone resin, or the like, for example.

A phosphor can be included in the sealing portion 26. The phosphor can be set to a yttrium-aluminum-garnet-based phosphor (YAG phosphor). However, a type of the phosphor can be appropriately changed according to a use, or the like, of the lighting device for vehicles 1 so that it is possible to obtain a desired luminescent color.

In addition, it is also possible to provide only the sealing portion 26 without providing the frame portion 25. When providing only the sealing portion 26, a dome-shaped sealing portion 26 is provided on the substrate 21.

The power feeding unit 30 includes the power feeding terminal 31 and an insulating portion 32.

The power feeding terminal 31 can be set to a styloid. The power feeding terminal 31 protrudes from the lower face of the recessed portion 11a. A plurality of the power feeding terminals 31 are provided. The plurality of power feeding terminals 31 can be provided in a predetermined direction in a line. The plurality of power feeding terminals 31 are provided inside the insulating portion 32. The plurality of power feeding terminals 31 extend inside the insulating portion 32, and protrude from an end face of the insulating portion 32 on the light emitting unit 20 side, and an end face of the insulating portion 32 on the heat radiating fin 14 side. The end portions of the plurality of power feeding terminals 31 on the light emitting unit 20 side are electrically or mechanically connected to the wiring pattern 21a which is provided on the substrate 21. That is, one end portion of the power feeding terminal 31 is soldered with the wiring pattern 21a. End portions of the plurality of power feeding terminals 31 on the heat radiating fin 14 side are exposed to the inside of the terminal cover 17. The connector 105 is fitted into the plurality of power feeding terminals 31 which are exposed to the inside of the terminal cover 17. The power feeding terminal 31 has conductivity. The power feeding terminal 31 can be formed of metal such as a copper alloy, for example. In addition, the number, a shape, a disposal, a material, or the like, of the power feeding terminal 31 is not limited to the example, and can be appropriately changed.

As described above, it is preferable to form the socket 10 using a material with high heat conductivity. However, there is a case in which a material with high heat conductivity has conductivity. For example, when it is a high heat conductive resin including filler formed of carbon, it has conductivity. For this reason, the insulating portion 32 is provided so as to insulate between the power feeding terminal 31 and the socket 10 with conductivity. In addition, the insulating portion 32 has a function of holding the plurality of power feeding terminals 31. In addition, when the socket 10 is formed of a high heat conductive resin with a property of insulation (for example, high heat conductive resin, or the like, including filler formed of ceramic), it is possible to omit the insulating portion 32. In this case, the socket 10 holds the plurality of power feeding terminals 31.

The insulating portion 32 is provided between the power feeding terminal 31 and the socket 10. The insulating portion 32 has an insulating property. The insulating portion 32 can be formed of an insulating resin. The insulating portion 32 can be formed of PET, nylon, or the like, for example. The insulating portion 32 is provided inside a hole 10a which is provided in the socket 10. The insulating portion 32 can be press-fitted, or bonded to the hole 10a, for example.

In a case of the lighting device for vehicles 1 provided in a vehicle, a temperature of a use environment becomes −40° C. to 85° C. For this reason, it is preferable to set a thermal expansion coefficient of a material of the insulating portion 32 to be closer to a thermal expansion coefficient of a material of the socket 10 if possible. In this manner, it is possible to reduce a thermal stress which is generated between the insulating portion 32 and the socket 10. For example, a material of the insulating portion 32 can be set to a high heat conductive resin included in the socket 10, or a resin included in the high heat conductive resin.

Since the lighting device for vehicles 1 provided with the light emitting element 22 is expensive compared to a lighting device for vehicles provided with a filament light bulb, the lighting device for vehicles provided with the light emitting element was not used in a popular vehicle such as a light vehicle, in general. However, in recent years, a price of the lighting device for vehicles 1 provided with the light emitting element 22 is reduced, and the lighting device for vehicles 1 provided with the light emitting element 22 is also adopted in the popular vehicle such as the light vehicle.

In general, a lighting tool for vehicles which is provided in a popular vehicle such as a light vehicle is smaller than that which is provided in a luxury vehicle. For this reason, in order to use the lighting device for vehicles 1 provided with the light emitting element 22 in a popular vehicle such as a light vehicle, it is necessary to make the external dimension D of the mounting unit 11 which is inserted into the lighting tool for vehicles small.

Meanwhile, there is no big difference in light intensity or light distributing property as a lighting device for vehicles between a popular vehicle such as a light vehicle and a luxury vehicle. For this reason, it is not easy to reduce the number of light emitting elements 22, or remarkably change a disposal of the plurality of light emitting elements 22, and to make a size of a region in which the plurality of light emitting elements 22 are provided small.

When it is not possible to make the size of the region in which the plurality of light emitting elements 22 are provided small, it is not easy to make a size of the substrate 21 small. In addition, as illustrated in FIGS. 1 and 2, the plurality of power feeding terminals 31 are soldered in the vicinity of the peripheral edge of the substrate 21. For this reason, when the external dimension D of the mounting unit 11 is set to be small, a distance between the side face of the recessed portion 11a and a peripheral edge of the substrate 21, and a distance between the side face of the recessed portion 11a and the plurality of power feeding terminals 31 become short. When the distance between the side face of the recessed portion 11a and the plurality of power feeding terminals 31 become short, it is not easy to perform a soldering work since soldering iron interferes with the side face of the recessed portion 11a.

Therefore, in the socket 10 according to the embodiment, a notch portion 11c is provided on the side face of the recessed portion 11a.

Figure 4A:
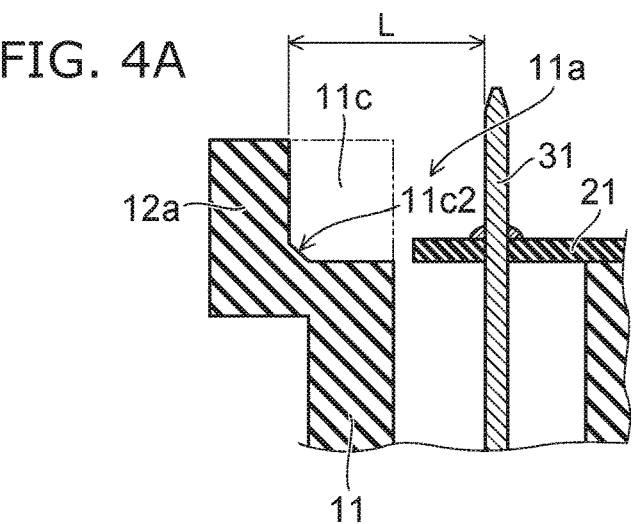
FIGS. 4A to 4C are schematic sectional views for exemplifying a notch portion.
Figure 4B:
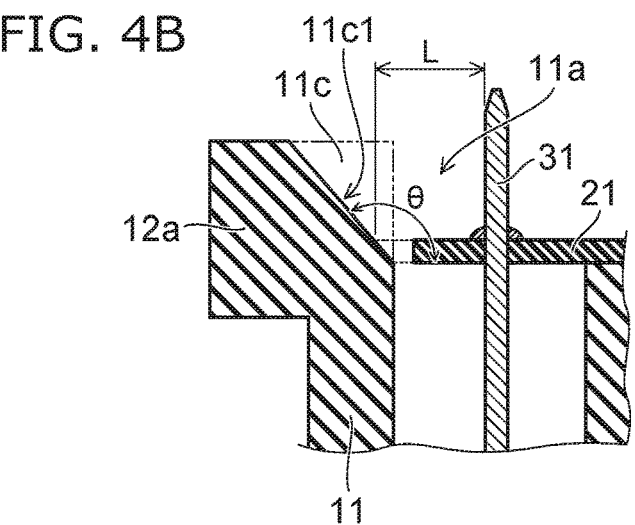
Figure 4C:
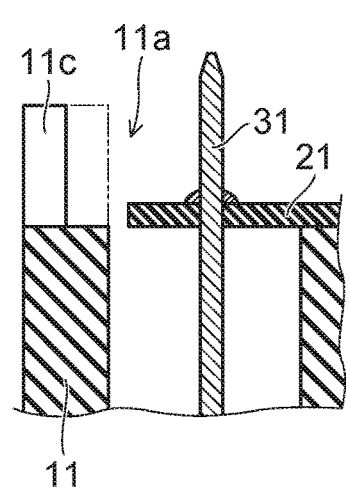

FIGS. 4A to 4C are schematic sectional views for exemplifying the notch portion 11c.

As illustrated in FIGS. 4A to 4C, the notch portion 11c can be provided at a portion of the side face of the recessed portion 11a which faces the plurality of power feeding terminals 31. The notch portion 11c can be opened to the side face of the recessed portion 11a. An upper end of the notch portion 11c can be opened to an end face of the mounting unit 11 on a side opposite to the flange 13 side. A lower end of the notch portion 11c can be provided on a lower face side of the recessed portion 11a rather than a face of the substrate 21 on which the light emitting element 22 is provided. For example, the lower end of the notch portion 11c can be provided at a position on a lower face of the recessed portion 11a. When the bayonet 12 is provided at a position of the mounting unit 11 in a circumferential direction at which the notch portion 11c is provided, as illustrated in FIGS. 4A and 4B, the side face of the notch portion 11c is provided inside the bayonet 12. When the bayonet 12 is not provided at the position at which the notch portion 11c is provided, as illustrated in FIG. 4C, the notch portion 11c passes through a portion between the outer side face of the mounting unit 11 and an inner side face (side face of recessed portion 11a) of the mounting unit 11. That is, the notch portion 11c can be opened to the outer side face of the mounting unit 11.

As illustrated in FIGS. 4A and 4B, when a part of the notch portion 11c is provided inside the bayonet 12, it is preferable that a distance L between the side face of the notch portion 11c and the plurality of power feeding terminals 31 be 2 mm or more. According to a knowledge which is obtained by inventors of the invention, when the distance L is 2 mm or more, it is possible to prevent the soldering iron from interfering with the inner side face of the mounting unit 11 in soldering using an automatic soldering device (soldering robot). For this reason, the soldering work becomes easy. In addition, when the side face of the notch portion 11c is provided inside the bayonet 12, it is possible to prevent rigidity of a tip end of the socket 10 from decreasing.

In addition, it is possible to provide a curved face or an inclined face at a corner portion 11c2 of the notch portion 11c. When the curved face or the inclined face is provided at the corner portion 11c2, it is possible to prevent rigidity of the tip end of the socket 10 from decreasing.

As illustrated in FIG. 4B, the side face of the notch portion 11c can be set to an inclined face 11c1 which is inclined in a direction separated from a center of the recessed portion 11a when being closer to an end face of the socket 10. An angle θ which is formed between the lower face of the recessed portion 11a and the inclined face 11c1 can be set to 100° or more and 165° or less. In this manner, it is possible to further prevent rigidity of the tip end of the socket 10 from decreasing.

In addition, it is possible to provide the above described curved face or the inclined face also at a corner portion provided at the peripheral edge of the inclined face 11c1.

When the side face of the notch portion 11c is set to the inclined face 11c1, as illustrated in FIG. 4B, a distance between a position of the inclined face 11c1 which is the same height as that of the surface of the substrate 21 and the plurality of power feeding terminals 31 becomes the above described distance L.

As illustrated in FIG. 4C, when it is the notch portion 11c which passes through a portion between the outer side face of the mounting unit 11 and the inner side face of the mounting unit 11, there is no portion interfered by the soldering iron, and it becomes easier to perform the soldering work.

Subsequently, the first bayonet 12a and the second bayonet 12b will be further described.

FIGS. 5A to 5D are schematic plan views for exemplifying the first bayonet 12a and the second bayonet 12b.

The total numbers of the first bayonet 12a and the second bayonet 12b can be set to 2 or more. In this case, as illustrated in FIGS. 5A to 5D, when the total numbers of the first bayonet 12a and the second bayonet 12b are set to three or more, it is possible to make a posture of the lighting device for vehicles 1 stable when mounting the lighting device for vehicles 1 to the lighting tool for vehicles 100.

As illustrated in FIGS. 5A to 5D, a width dimension Wa of the first bayonet 12a is longer than a width dimension Wb of the second bayonet 12b.

Figure 5A:
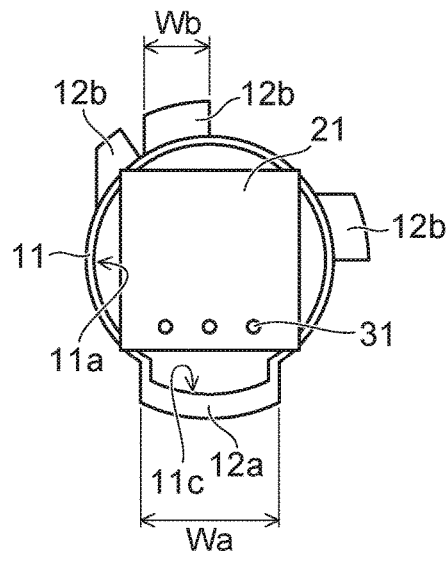
FIGS. 5A to 5D are schematic plan views for exemplifying a first bayonet and a second bayonet.
Figure 5B:
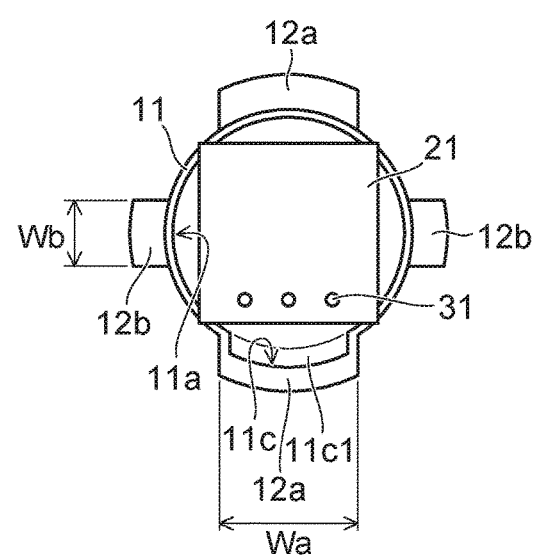
Figure 5C:
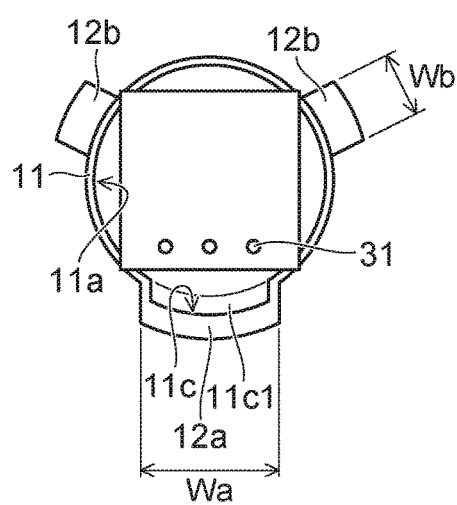
Figure 5D:
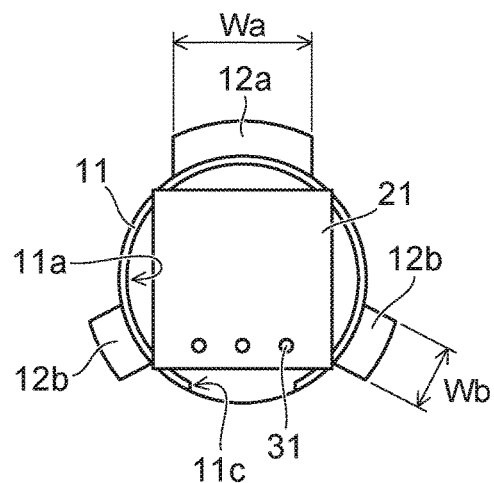

A disposal of the first bayonet 12a is not particularly limited; however as illustrated in FIGS. 5A to 5C, it is preferable to make the first bayonet 12a face the plurality of power feeding terminals 31. By doing so, it becomes easy to form the side face of the notch portion 11c in the inside of the first bayonet 12a. For this reason, it is possible to prevent rigidity of the tip end of the socket 10 from decreasing.

A disposal of the second bayonet 12b is not particularly limited. Here, the external dimension D of the mounting unit 11 is set to be appropriately the same, regardless of a type of the lighting device for vehicles 1. For this reason, there is a concern that an assembling failure may occur when mounting the lighting device for vehicles 1 on the lighting tool for vehicles 100. In this case, when the number or a disposal of the second bayonet 12b is set to be different according to a type of the lighting device for vehicles 1, it is possible to prevent the assembling failure. For example, when the lighting device for vehicles 1 is a stop lamp, it is possible to dispose the second bayonet 12b which is exemplified in FIG. 5A. For example, when the lighting device for vehicles 1 is a turn signal lamp, it is possible to dispose the second bayonet 12b which is exemplified in FIG. 5B. For example, when the lighting device for vehicles 1 is a back lamp, it is possible to dispose the second bayonet 12b which is exemplified in FIG. 5C.

Lighting Tool for Vehicles

Subsequently, the lighting tool for vehicles 100 will be exemplified.

Hereinafter, as an example, a case in which the lighting tool for vehicles 100 is a front combination light which is provided in a vehicle will be described. However, the lighting tool for vehicles 100 is not limited to the front combination light which is provided in a vehicle. The lighting tool for vehicles 100 may be a lighting tool for vehicles which is provided in a vehicle, a railway vehicle, or the like.

Figure 6:
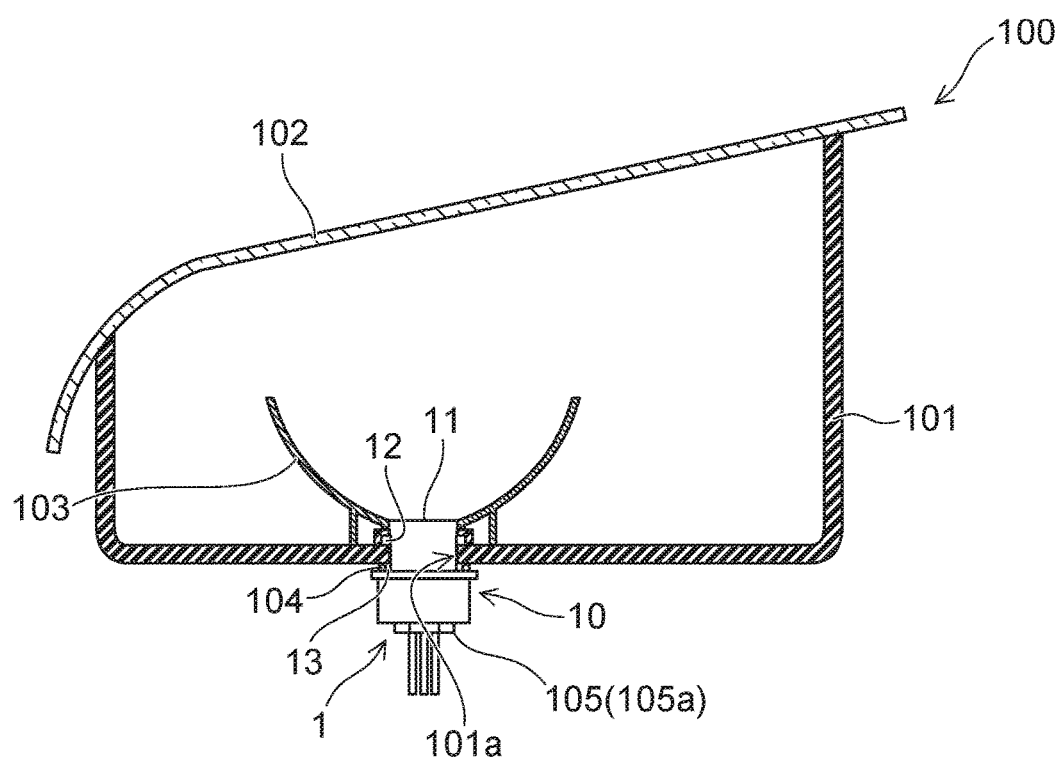
FIG. 6 is a partial sectional view for schematically exemplifying a lighting tool for vehicles.

FIG. 6 is a partial sectional view for schematically exemplifying the lighting tool for vehicles 100.

As illustrated in FIG. 6, the lighting tool for vehicles 100 is provided with the lighting device for vehicles 1, the housing 101, a cover 102, an optical element portion 103, a sealing member 104, and the connector 105.

The housing 101 holds the mounting unit 11. The housing 101 is formed in a box shape of which one end portion side is open. The housing 101 can be formed of a resin, or the like, through which light is not transmitted. An attaching hole 101a into which a portion at which the bayonet 12 of the mounting unit 11 is provided is inserted is provided on a lower face of the housing 101. A recessed portion into which the bayonet 12 provided in the mounting unit 11 is inserted is provided at the peripheral edge of the attaching hole 101a. In addition, a case in which the attaching hole 101a is directly provided in the housing 101 is exemplified; however, an attaching member including the attaching hole 101a may be provided in the housing 101.

When attaching the lighting device for vehicles 1 to the lighting tool for vehicles 100, the portion in which the bayonet 12 of the mounting unit 11 is provided is inserted into the attaching hole 101a, and the lighting device for vehicles 1 is rotated. Then, the bayonet 12 is held in a joint portion provided at the peripheral edge of the attaching hole 101a. Such an attaching method is referred to as a twist lock.

The cover 102 is provided so as to shut off the opening of the housing 101. The cover 102 can be formed of a light-transmitting resin, or the like. It is also possible to set the cover 102 so as to have a function of a lens, or the like.

Light output from the lighting device for vehicles 1 is input to the optical element portion 103. The optical element portion 103 performs reflection, diffusion, light guiding, condensing, a formation of a predetermined light distributing pattern, or the like, of light output from the lighting device for vehicles 1. For example, the optical element portion 103 exemplified in FIG. 6 is a reflector. In this case, the optical element portion 103 reflects light output from the lighting device for vehicles 1, and forms a predetermined light distributing pattern.

The sealing member 104 is provided between the flange 13 and the housing 101. The sealing member 104 can be formed in an annular shape. The sealing member 104 can be formed of an elastic material such as rubber or a silicone resin.

When attaching the lighting device for vehicles 1 to the lighting tool for vehicles 100, the sealing member 104 is interposed between the flange 13 and the housing 101. For this reason, an inner space of the housing 101 is enclosed by the sealing member 104. In addition, the bayonet 12 is pushed to the housing 101 due to an elastic force of the sealing member 104. For this reason, it is possible to prevent the lighting device for vehicles 1 from escaping from the housing 101.

The connector 105 is fitted to end portions of the plurality of power feeding terminals 31 which are exposed to the inside of the terminal cover 17. A power supply (not illustrated), or the like, is electrically connected to the connector 105. For this reason, the power supply (not illustrated), or the like, and the light emitting element 22 are electrically connected when the connector 105 is fitted to the end portion of the power feeding terminal 31. In addition, the connector 105 has a stepped portion. In addition, a sealing member 105a is attached to the stepped portion. The sealing member 105a is provided in order to prevent water from entering the inside of the terminal cover 17. When the connector 105 including the sealing member 105a is inserted into the terminal cover 17, the inside of the terminal cover 17 is enclosed so as to be watertight. The sealing member 105a can be formed in an annular shape. The sealing member 105a can be formed of a material with elasticity such as rubber, a silicone resin, or the like. It is also possible to bond the connector 105 to the terminal cover 17, or the like, using an adhesive, or the like, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, above-mentioned embodiments can be combined mutually and can be carried out.

What is claimed is:

1. A lighting device for vehicles comprising:
a mounting unit including a recessed portion which is provided on one face of a flange, and is open to an end face on a side opposite to a side of the flange;
a substrate which is provided on a lower face side of the recessed portion, and includes a light emitting element on a face on the side opposite to a side of the flange; and
a plurality of power feeding terminals which protrude from the lower face of the recessed portion, and are soldered to a wiring pattern provided on the substrate,
wherein a notch portion is provided at a portion on a side face of the recessed portion which faces the plurality of power feeding terminals.

2. The device according to claim 1,
wherein an upper end of the notch portion is open to an end face of the mounting unit on a side opposite to a side of the flange.

3. The device according to claim 1,
wherein a lower end of the notch portion is provided closer to the lower face side of the recessed portion than a face of the substrate on which the light emitting element is provided.

4. The device according to claim 1,
wherein a distance of the notch portion between the side face which faces the plurality of power feeding terminals and the plurality of power feeding terminals is 2 mm or more.

5. The device according to claim 4,
wherein at least two bayonets are provided on an outer face side of the mounting unit, and
the side face of the notch portion is provided in the inside of at least any one of the bayonet.

6. The device according to claim 1,
wherein the notch portion is open to an outer side face of the mounting unit.

7. The device according to claim 1,
wherein a curved face or an inclined face is provided at a corner portion on a lower face side of the notch portion.

8. The device according to claim 1,
wherein a lower end of the notch portion is provided at a position on a lower face of the recessed portion.

9. The device according to claim 1,
wherein a bayonet is provided at a position of the mounting unit in a circumferential direction at which the notch portion is provided.

10. The device according to claim 4,
wherein the side face of the notch portion is set to an inclined face which is inclined in a direction separated from a center of the recessed portion when being closer to an end face of the mounting unit on a side opposite to a side of the flange.

11. The device according to claim 10,
wherein an angle formed by a lower face of the recessed portion and the inclined face is 100 or more and 165° or less.

12. The device according to claim 10,
wherein a distance between a position of the inclined face which is the same height as a height of the face of the substrate on which the light emitting element is provided and the plurality of power feeding terminals is 2 mm or more.

13. The device according to claim 1,
wherein a tip end of soldering iron can be inserted into the inside of the notch portion.

14. The device according to claim 5,
wherein the at least two bayonets include a first bayonet and a second bayonet, and
a width dimension of the first bayonet is longer than a width dimension of the second bayonet.

15. The device according to claim 14,
wherein the first bayonet faces the power feeding terminals.

16. The device according to claim 14,
wherein at least any one of the number and a disposal of the second bayonet is different according to a type of the lighting device for vehicles.

17. The device according to claim 1,
wherein the face of the flange on a side opposite to the side on which the mounting unit is provided is provided with at least one heat radiating fin.

18. The device according to claim 17,
wherein the flange, the mounting unit, and the heat radiating fin are integrally molded.

19. The device according to claim 17,
wherein the flange, the mounting unit, and the heat radiating fin include a high heat conductive resin.

20. A lighting tool for vehicles comprising:
the lighting device for vehicles according to claim 1; and
a housing in which the lighting device for vehicles is provided.

* * * * *